US010638525B2

(12) United States Patent
Kurashige

(10) Patent No.: US 10,638,525 B2
(45) Date of Patent: Apr. 28, 2020

(54) TRANSMISSION DEVICE, RECEPTION DEVICE, AND COMMUNICATION SYSTEM FOR TRANSMITTING DATA

(71) Applicant: JVC KENWOOD Corporation, Yokohama-shi, Kanagawa (JP)

(72) Inventor: Hiroyuki Kurashige, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 16/170,282

(22) Filed: Oct. 25, 2018

(65) Prior Publication Data

US 2019/0069331 A1 Feb. 28, 2019

Related U.S. Application Data

(63) Continuation of application No. PCT/JP2017/012404, filed on Mar. 27, 2017.

(30) Foreign Application Priority Data

Apr. 27, 2016 (JP) ................................. 2016-089463

(51) Int. Cl.
*H04W 76/11* (2018.01)
*H04W 4/10* (2009.01)
(Continued)

(52) U.S. Cl.
CPC ....... *H04W 76/11* (2018.02); *H04M 3/42348* (2013.01); *H04M 3/56* (2013.01);
(Continued)

(58) Field of Classification Search
CPC ....... H04W 76/11; H04W 76/45; H04W 4/10; H04W 4/021; H04W 56/004;
(Continued)

(56) References Cited

U.S. PATENT DOCUMENTS

2012/0196625 A1* 8/2012 Morrison ............... G06Q 30/02
455/456.3
2013/0072234 A1* 3/2013 Morrison ......... G08G 1/096725
455/456.3
(Continued)

FOREIGN PATENT DOCUMENTS

EP 3157275 A1 4/2017
JP 2003099449 A 4/2003
(Continued)

*Primary Examiner* — Brian D Nguyen
(74) *Attorney, Agent, or Firm* — Brundidge & Stanger, P.C.

(57) ABSTRACT

A generator generates a first combination including identification information associating area information indicating an area where data should be received and a timing when the area information should be transmitted, and the area information and that generates a second combination including the identification information in the first combination and data. A transmitter transmits one of the first combination and the second combination generated by the generator. The generator generates the second combination at a further timing subsequent to the timing associated with the identification information in the first combination. The transmitter transmits the first combination at the timing associated with the identification information in the first combination and transmits the second combination at the further timing.

5 Claims, 13 Drawing Sheets

(51) Int. Cl.

| | |
|---|---|
| *H04W 56/00* | (2009.01) |
| *H04W 76/45* | (2018.01) |
| *H04M 3/56* | (2006.01) |
| *H04M 11/00* | (2006.01) |
| *H04W 4/021* | (2018.01) |
| *H04M 3/42* | (2006.01) |

(52) U.S. Cl.
CPC .......... *H04M 11/00* (2013.01); *H04W 4/021* (2013.01); *H04W 4/10* (2013.01); *H04W 56/004* (2013.01); *H04W 76/45* (2018.02); *H04M 2203/205* (2013.01); *H04M 2203/2072* (2013.01)

(58) Field of Classification Search
CPC .... H04M 3/42348; H04M 3/56; H04M 11/00; H04M 2203/205; H04M 2203/2072
See application file for complete search history.

(56) References Cited

U.S. PATENT DOCUMENTS

| | | | |
|---|---|---|---|
| 2014/0177437 A1* | 6/2014 | Korus | H04W 76/45 370/230 |
| 2014/0269556 A1* | 9/2014 | Mechaley, Jr. | H04W 4/10 370/329 |
| 2014/0333412 A1* | 11/2014 | Lewis | G07C 9/00031 340/5.2 |
| 2016/0094700 A1* | 3/2016 | Lee | H04W 8/245 455/419 |
| 2016/0227384 A1* | 8/2016 | Mazzarella | H04W 4/021 |
| 2016/0308684 A1* | 10/2016 | Zhu | H04W 4/06 |
| 2016/0373584 A1* | 12/2016 | Minutillo | G06Q 10/10 |

FOREIGN PATENT DOCUMENTS

| | | |
|---|---|---|
| JP | 2005006290 A | 1/2005 |
| JP | 2007028022 A | 2/2007 |
| WO | 2008026430 A1 | 3/2008 |

* cited by examiner

FIG.6

| MESSAGE NUMBER | time | SITUATION OF TRANSMISSION FROM COMMAND STATION | CONTROL INFORMATION ||
| --- | --- | --- | --- | --- |
| | | | AREA INFORMATION | ID |
| 1 | 10:00 | TRANSMISSION TO FIRST AREA | 1 | 1 |
| 2 | 11:00 | TRANSMISSION TO SECOND AREA | 2 | 2 |

| AREA INFORMATION | IDENTIFICATION INFORMATION | SPEECH INFORMATION |

FIG.7B

| IDENTIFICATION INFORMATION | SPEECH INFORMATION |

FIG.7C

| IDENTIFICATION INFORMATION 1 | IDENTIFICATION INFORMATION 2 | SPEECH INFORMATION |

FIG.13A

| AREA INFORMATION | IDENTIFICATION INFORMATION |

FIG.13B

| IDENTIFICATION INFORMATION | SPEECH INFORMATION |

TRANSMISSION DEVICE, RECEPTION DEVICE, AND COMMUNICATION SYSTEM FOR TRANSMITTING DATA

CROSS-REFERENCE TO RELATED APPLICATION

This application is based upon and claims the benefit of priority from the prior Japanese Patent Application No. 2016-089463, filed on Apr. 27, 2016, the entire contents of which are incorporated herein by reference.

BACKGROUND

1. Field

The present invention relates to communication technologies and, more particularly, to a transmission device, a reception device, and a communication system for transmitting data.

2. Description of the Related Art

In multicast communication, the same information for delivery is transmitted to a plurality of terminal devices. The content of traffic information for delivery is formed by a plurality of sub-content items each comprised of an area identifier and at least one traffic information item for the area. When a terminal device determines that the traffic information is useful by referring to the area identifier in the sub-content, the terminal device presents the traffic information to the operator of the terminal device (see, for example, patent document 1).

[patent document 1] JP2007-28022

By including an area identifier, it is possible to transmit information to a terminal device located in a certain area. If a certain time has elapsed since the transmission of such information, however, the terminal may have moved so that it is difficult to transmit information for again to the terminal device found when the information was transmitted previously.

SUMMARY OF THE INVENTION

A transmission device according to an embodiment includes: a generator that generates a first combination including (i) identification information associating area information indicating an area where data should be received and a timing when the area information should be transmitted, and (ii) the area information and that generates a second combination including the identification information in the first combination and data; and a transmitter that transmits one of the first combination and the second combination generated by the generator. The generator generates the second combination at a further timing subsequent to the timing associated with the identification information in the first combination, and the transmitter transmits the first combination at the timing associated with the identification information in the first combination and transmits the second combination at the further timing.

Another embodiment relates to a reception device. The device includes: a first receiver that receives a first combination including (i) identification information associating area information indicating an area where data should be received and a timing when the area information should be transmitted, and (ii) the area information; and a storage that stores the identification information in the first combination when the reception device is located in the area indicated by the area information in the first combination received by the first receiver; a second receiver that receives a second combination including the identification information in the first combination and data, at a timing subsequent to the timing associated with the identification information in the first combination; and a processor that processes the data in the second combination when the identification information in the second combination received by the second receiver matches the identification information stored in the storage.

Still another embodiment relates to a communication system. The communication system includes: a transmission device that generates and transmits a first combination including (i) identification information associating area information indicating an area where data should be received and a timing when the area information should be transmitted, and (ii) the area information; and a reception device that receives the first combination and stores the identification information in the first combination when the reception device is located in the area indicated by the area information in the first combination received. The transmission device generates and transmits a second combination including the identification information in the first combination and data, at a timing subsequent to the timing associated with the identification information in the first combination; and the reception device receives the second combination and processes the data in the second combination when the identification information in the second combination received matches the identification information stored.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 shows a data structure of a table stored in the memory unit of FIG. 4;

FIGS. 7A-7C show formats of signals transmitted from the transmission unit of FIG. 4;

FIG. 13A-13B show formats of signals transmitted from the transmission unit according to Embodiment 2.

DETAILED DESCRIPTION

Figure 1:
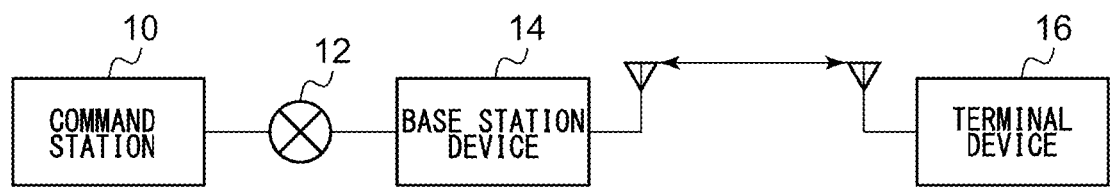
FIG. 1 shows a configuration of a communication system according to Embodiment 1.

The invention will now be described by reference to the preferred embodiments. This does not intend to limit the scope of the present invention, but to exemplify the invention.

Embodiment 1

A summary of the embodiments will be given before describing the embodiments in specific detail. Embodiment 1 relates to a communication system in which a command station transmits data to a plurality of terminal devices via a base station device. In Embodiment 1, it is assumed that the communication system is a business wireless system and the data is speech information. In this case, the command station designates an area that speech information should be transmitted to and executes a Push To Talk (PTT) service. Speech information transmitted from the command station is received by one or more terminal devices located in the designated area via the base station.

In this situation, there may be cases where speech information is transmitted to one or more terminal devices located in a certain area and it is then desired to transmit speech information to the one or more terminal devices again. However, the more the timing of initial transmission of speech information is apart from the timing that speech information should be transmitted next, the more likely that the terminal device located in said certain area leaves said certain area. This makes it difficult to transmit speech information to the terminal device located in said certain area in the past. To address this issue, the communication system according to this embodiment executes the following process.

When transmitting speech information, the command station generates identification information (hereinafter, also referred to as "ID") that associates area information indicating an area where the speech information should be received with the timing of transmission. The command station transmits a first combination including the area information, the speech information, and the identification information via the base station device. The terminal device identifies the current position. The terminal device also determines whether the terminal device is located in the area designated by the area information upon receipt of the first combination. When the terminal device is located in the area, the terminal device plays back the speech information included in the first combination and outputs the speech. The terminal device also stores the identification information.

When a certain period of time elapses after the process as described above is executed and when speech information should be transmitted to the terminal device located in the area designated by the area information already transmitted, the command station transmits a second combination including the identification information already transmitted and the speech information. When the second combination is received, the terminal device compares the identification information included in the second combination and the identification information stored. When they match, the terminal device plays back the speech information included in the second combination and outputs the speech.

FIG. 1 shows a configuration of a communication system 100 according to Embodiment 1. The communication system 100 includes a command station 10, a network 12, a base station device 14, and a terminal device 16. The number of base station devices 14 and terminal devices 16 in the communication system 100 is not limited to "1". For clarity of the explanation, only "1" each of the base station device 14 and the terminal device 16 is shown.

The command station 10 receives an instruction relating to an area that speech information should be transmitted to, from an operator via a user interface console. Upon receiving speech from the operator via a microphone connected to the console while the PTT button is being pressed, the command station 10 generates speech information from the speech. The command station 10 transmits the speech information to the base station device 14 via the network 12, and the base station device 14 transmits the speech information. The base station device 14 and the terminal device 16 are compatible with a business wireless system, and the transmission represents broadcasting.

When the terminal device 16 is located in the area designated by the command station 10, the terminal device 16 plays back the received speech information and outputs the speech. Designation of an area varies depending on whether the speech information should be received by the terminal device 16 currently located in the designated area or the speech information should be received by the terminal device 16 located in the designated area in the past. Designation of an area as indicated above will be described later. It is possible for the terminal device 16 to transmit speech information to the command station 10, but a description of the feature will be omitted here.

Figure 2:
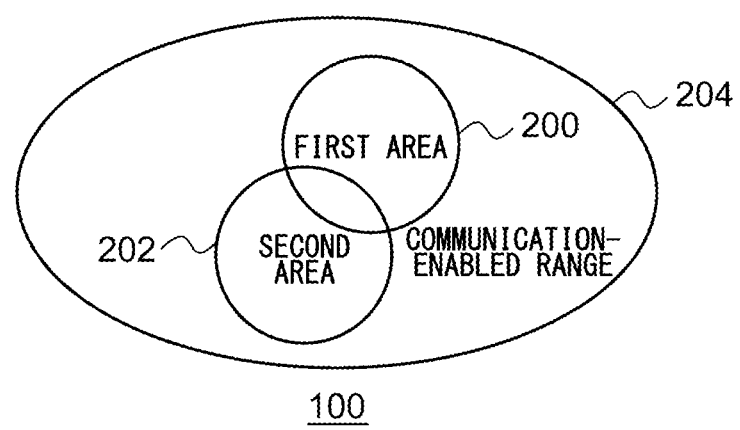
FIG. 2 shows areas formed in the communication system of FIG. 1.

FIG. 2 shows a communication-enabled range 204 in the communication system 100 in which communication from the base station device 14 to the terminal device 16 is possible and areas designated by the command station 10. In this case, it is assumed by way of example that two areas including a first area 200 and a second area 202 are designated in the communication-enabled range 204. As shown in FIG. 2, area information indicating a range of each area is comprised of the latitude and longitude of the central position of the area and the radius of the area, given that the area is circular. The shape of an area is not limited to circular, but it is assumed that the area is circular for clarity of the description.

Figure 3:
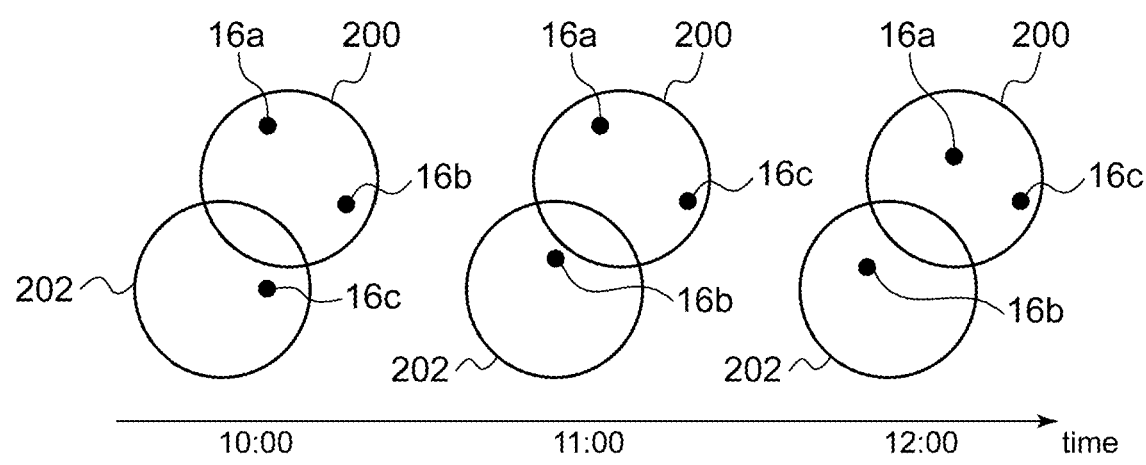
FIG. 3 shows temporal change of the terminal devices included in the areas of FIG. 2.

FIG. 3 shows temporal change of the terminal devices 16 included in the areas. By way of one example, the figure shows the first area 200 and the second area 202 at three points of time "10:00", "11:00" and "12:00". In the following description, "10:00", "11:00", and "12:00" may be referred to as "a first timing", "a second timing", and "a third timing". The first area 200 and the second area 202 are shown as they are shown in FIG. 2. FIG. 3 further shows a first terminal device 16a, a second terminal device 16b, and a third terminal device 16c.

At the first timing "10:00", the first terminal device 16a and the second terminal device 16b are located in the first area 200, and the third terminal device 16c is located in the second area 202. At the second timing "11:00" subsequent to the first timing, the first terminal device 16a and the third terminal device 16c are located in the first area 200, and the second terminal device 16b is located in the second area 202. In other words, the second terminal device 16b has moved from the first area 200 to the second area 202, and the third terminal device 16c has moved from the second area 202 to the first area 200. At the third timing "12:00" subsequent to the second timing, the first terminal device 16a and the third terminal device 16c are located in the first area 200, and the second terminal device 16b is located in the second area 202.

A purpose of this embodiment is to transmit speech information to the first terminal device 16a and the second terminal device 16b at the third timing, after transmitting speech information to the first terminal device 16a and the second terminal device 16b located in the first area 200 at the first timing. As illustrated, the first terminal device 16a is located in the first area 200 at the third timing, but the second terminal device 16b is located in the second area 202.

Figure 4:
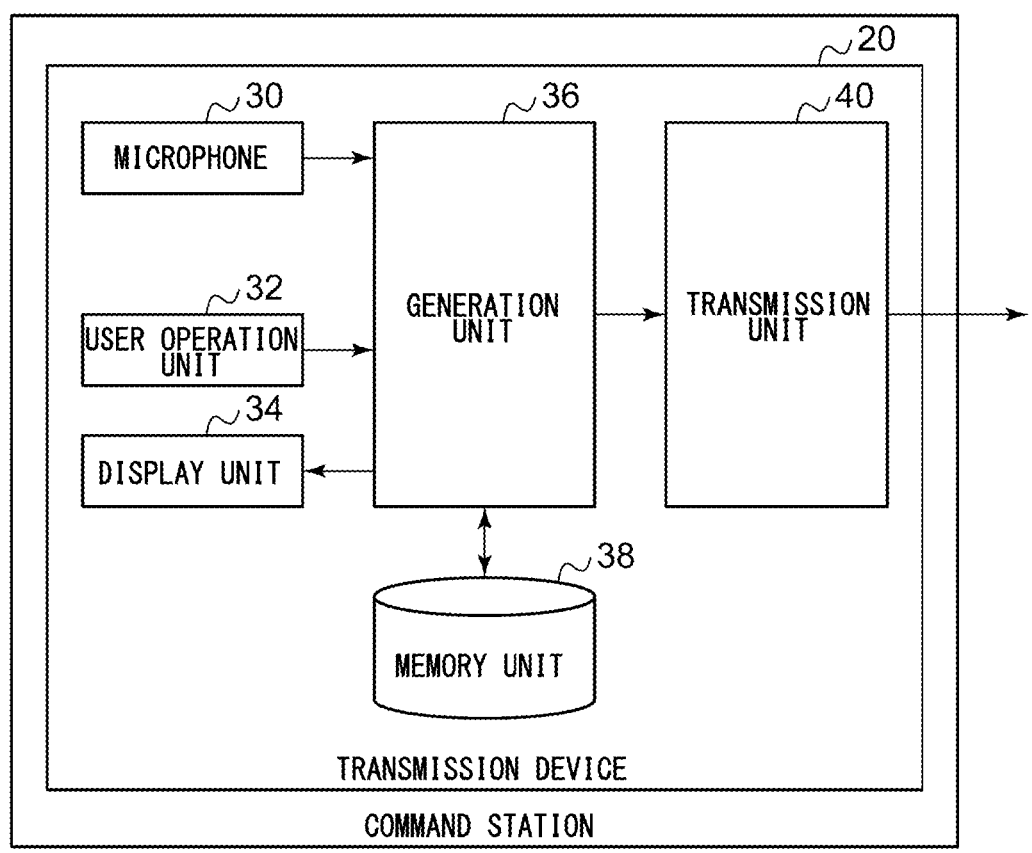
FIG. 4 shows a configuration of the command station of FIG. 1.

FIG. 4 shows a configuration of the command station 10. The command station 10 includes a transmission device 20. The transmission device 20 includes a microphone 30, a user operation unit 32, a display unit 34, a generation unit 36, a memory unit 38, and a transmission unit 40. The command station 10 may include functions other than that of the transmission device 20. For example, the command station 10 may include a reception function, but a description thereof is omitted.

The user operation unit 32 is an input interface that receives an instruction from an operator using the command station 10. The user operation unit 32 is comprised of a keyboard, a mouse, a touch panel, etc. The display unit 34 is a monitor that displays a screen for prompting the operator to enter an instruction. The generation unit 36 is connected to the user operation unit 32 and the display unit 34. The generation unit 36 generates a screen that should be displayed on the display unit 34 and also acquires an instruction received in the user operation unit 32. A description will be given of an instruction from the operator received in the user operation unit 32 and the display unit 34, with reference to a screen displayed on the display unit 34.

Figure 5:
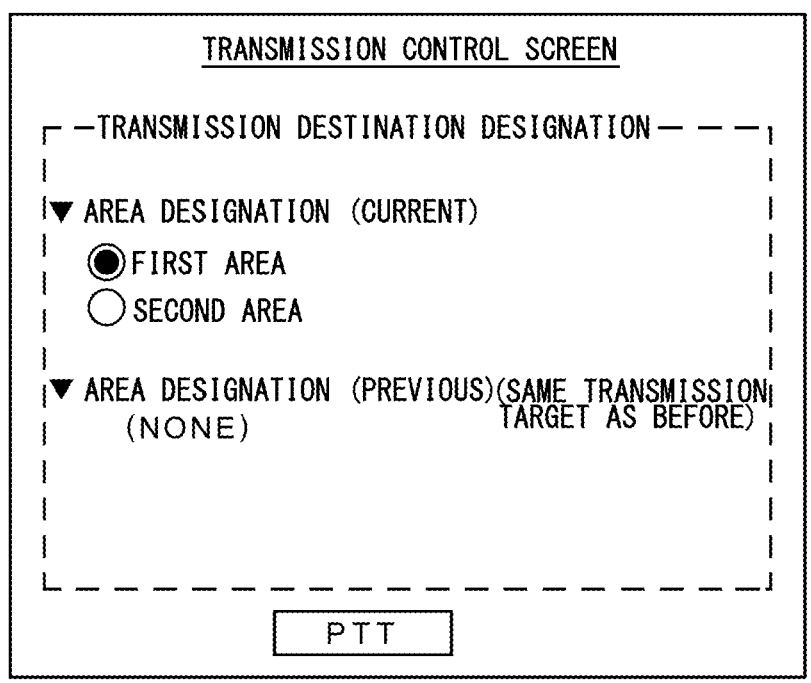
FIG. 5 shows a transmission control screen displayed on the display unit of FIG. 4.

FIG. 5 shows a screen displayed at the first timing "10:00" of FIG. 3. FIG. 5 shows a transmission control screen displayed on the display unit 34. It is assumed that speech information is received at the first timing by the terminal device 16 located in the first area 200 of FIG. 3. The operator selects "first area" as a target area for reception, using the user operation unit 32. The generation unit 36 acquires an instruction for selection of "first area" from the user operation unit 32. In the field "area designation (previous)", the area designated previously is shown. There is no previous transmission here so that "(NONE)" is displayed and no options are displayed. Further, the operator uses the user operation unit 32 to select the "PTT" button and speaks to the microphone 30 of FIG. 4. The microphone 30 changes the speech into an electrical signal and outputs the electrical signal (hereinafter, referred to as "speech information") to the generation unit 36.

Since no options in "area designation (previous)" are selected, the generation unit 36 generates area information indicating the first area 200 where the speech information should be received. Further, the generation unit 36 generates identification information that associates the area information indicating the first area 200 with the first timing "10:00" when the area information should be transmitted. For example, the generation unit 36 generates an ID "1". Further, the generation unit 36 generates a first combination including the area information, the identification information, and the speech information. Reference is made back to FIG. 4. The generation unit 36 outputs the first combination to the transmission unit 40 and stores the detail of the first combination in the memory unit 38.

The memory unit 38 stores the detail of the first combination in accordance with an instruction from the generation unit 36. FIG. 6 shows a data structure of a table stored in the memory unit 38. At the first timing "10:00", the information included in the row with a message number "1" is stored. The area information and the ID, i.e., the identification information, are generically referred to as control information. Reference is made back to FIG. 4.

The transmission unit 40 receives the first combination from the generation unit 36. The transmission unit 40 transmits the first combination to the base station device 14 via the network 12 (not shown). FIGS. 7A-7C show formats of signals transmitted from the transmission unit 40. FIG. 7A shows a format of the first combination. The format includes "area information", "identification information", and "speech information". FIGS. 7B-7C will be discussed later, and reference is made back to FIG. 4. The first combination is broadcasted from the base station device 14 and received by the terminal device 16.

Figure 8:
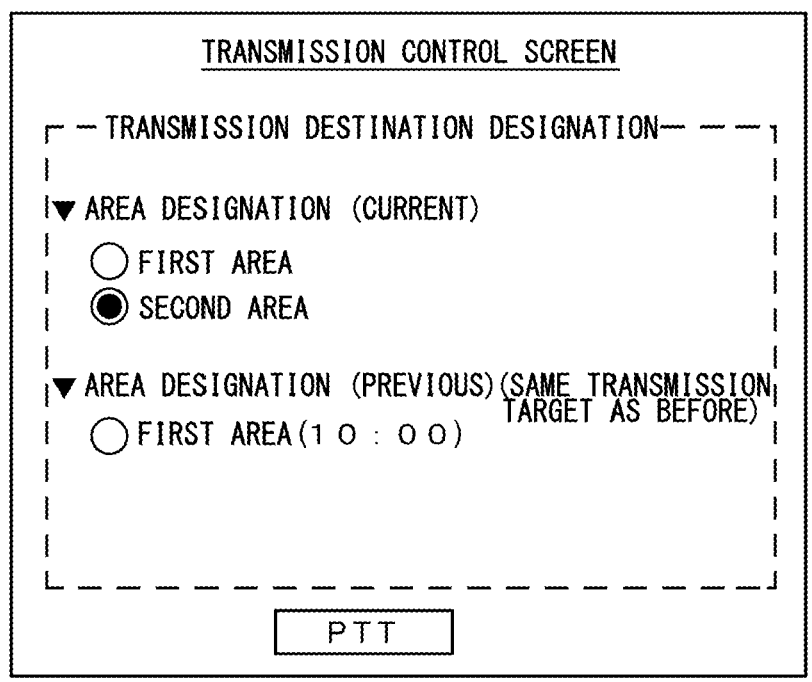
FIG. 8 shows another transmission control screen displayed on the display unit of FIG. 4.

FIG. 8 shows a screen displayed at the second timing "11:00" of FIG. 3. FIG. 8 shows another transmission control screen displayed on the display unit 34. It is assumed that speech information is received at the second timing by the terminal device 16 located in the second area 202 of FIG. 3. The operator selects "second area" as a target area for reception occur, using the user operation unit 32. The generation unit 36 acquires an instruction for selection of "second area" from the user operation unit 32. In the field "area designation (previous)", an option "first area (10:00)" is displayed in association with the transmission at the first timing. The field "area designation (previous)" is displayed in accordance with the table stored in the memory unit 38. Further, the operator uses the user operation unit 32 to select the "PTT" button and speaks to the microphone 30 of FIG. 4. The microphone 30 outputs the speech information to the generation unit 36.

Since no options in "area designation (previous)" are selected, the generation unit 36 generates area information indicating the second area 202 where the speech information should be received. Further, the generation unit 36 generates identification information that associates the area information indicating the second area 202 with the second timing "11:00" when the area information should be transmitted. For example, the generation unit 36 generates an ID "2". Further, the generation unit 36 generates a first combination including the area information, the identification information, and the speech information. Reference is made back to FIG. 4. The generation unit 36 outputs the first combination to the transmission unit 40 and stores the detail of the first combination in the memory unit 38.

The memory unit 38 stores the detail of the first combination in accordance with an instruction from the generation unit 36. Referring to FIG. 6, the information included in the row with a message number "2" is stored at the second timing "11:00". The transmission unit 40 receives the first combination from the generation unit 36. The transmission unit 40 transmits the first combination to the base station device 14 via the network 12 (not shown). The format shown in FIG. 7A is also used in this case.

Figure 9:
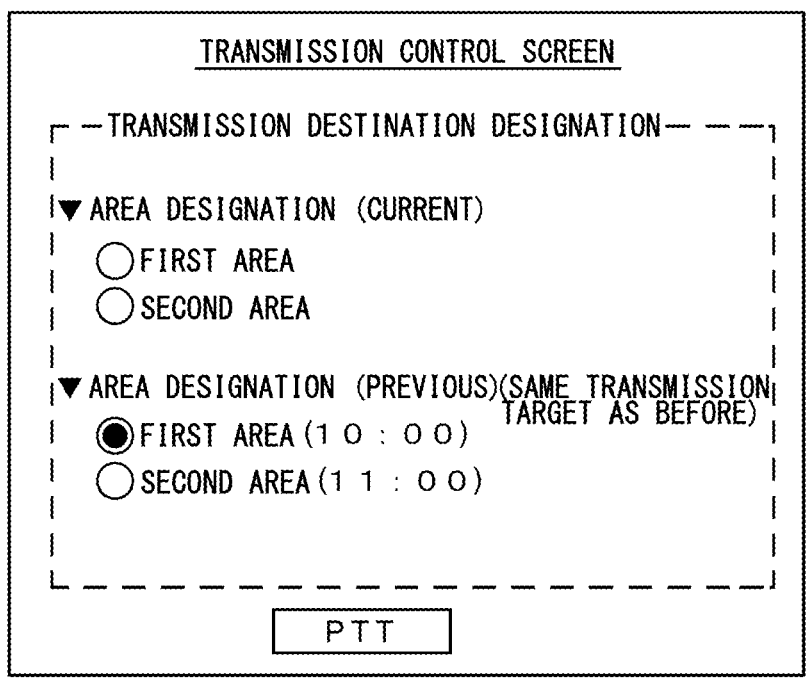
FIG. 9 shows still another transmission control screen displayed on the display unit of FIG. 4.

FIG. 9 shows a screen subsequently displayed at the third timing "12:00" of FIG. 3. FIG. 9 shows still another transmission control screen displayed on the display unit 34. It is assumed that speech information is received at the third timing by the terminal device 16 located in the first area 200 at "10:00" of FIG. 3. In other words, the first area 200 and the second area 202 at the third timing are not defined as a target of reception. The operator selects "first area (10:00)" as a target area for reception, using the user operation unit 32. In the field "area designation (previous)", an option "second area (11:00)" is additionally displayed in association with the transmission at the second timing. The field "area designation (previous)" is displayed in accordance with the table stored in the memory unit 38 in this case, too.

Further, the operator uses the user operation unit 32 to select the "PTT" button and speaks to the microphone 30 of FIG. 4. The microphone 30 outputs the speech information to the generation unit 36.

Since an option in "area designation (previous)" is selected, the generation unit 36 does not generate area information. Instead, the generation unit 36 acquires from the table stored in the memory unit 38 the ID "1", i.e., the identification information in the first combination at the first timing. Further, the generation unit 36 generates a second combination that includes identification and speech information and does not include area information. Reference is made back to FIG. 4. The generation unit 36 outputs the second combination to the transmission unit 40 and stores the detail of the second combination in the memory unit 38.

The transmission unit 40 receives the second combination from the generation unit 36. The transmission unit 40 transmits the second combination to the base station device 14 via the network 12 (not shown). The format of the second combination is shown in FIG. 7B. The format includes "identification information" and "speech information". As in the case of the first combination, the base station device 14 broadcasts the second combination.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

Figure 10:
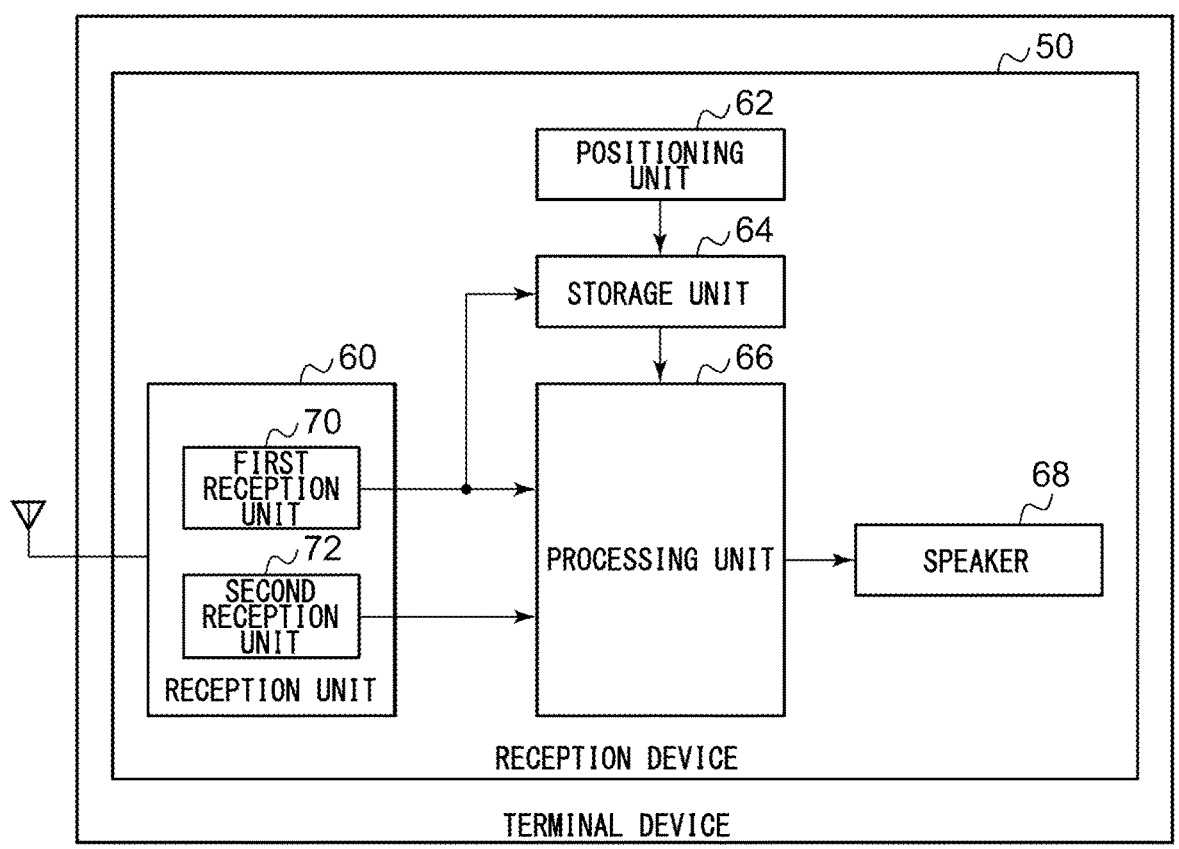
FIG. 10 shows a configuration of the terminal device of FIG. 1.

FIG. 10 shows a configuration of the terminal device 16. The terminal device 16 includes a reception device 50. The reception device 50 includes a reception unit 60, a positioning unit 62, a storage unit 64, a processing unit 66, and a speaker 68. Further, the reception unit 60 includes a first reception unit 70 and a second reception unit 72. The terminal device 16 may include functions other than that of the reception device 50. For example, the terminal device 16 may include a transmission function, but a description thereof is omitted.

The reception unit 60 is compatible with a business wireless system and receives a signal from the command station 10 via the base station device 14. The signal is the first combination or the second combination described above. When the signal received by the reception unit 60 includes area information, the first reception unit 70 acquires the first combination. As described above, the first combination includes the area information, the identification information, and the speech information. The first reception unit 70 outputs the first combination to the storage unit 64 and the processing unit 66.

The positioning unit 62 measures the position of the terminal device 16 by receiving a signal from a Global Positioning System (GPS) satellite. A publicly known technology may be used for measurement of the position, and a description thereof is omitted. The position is denoted by a latitude and a longitude. The positioning unit 62 measures the position periodically. The positioning unit 62 successively outputs the measured position to the storage unit 64 as position information.

The storage unit 64 receives the position information from the positioning unit 62 and also receives the first combination from the first reception unit 70. When the position information is included in the area indicated by the area information in the first combination, the storage unit 64 stores the identification information in the first combination and notifies the processing unit 66 that the terminal device 16 is located in the area. Meanwhile, when the position information is not included in the area indicated by the area information in the first combination, the storage unit 64 discards the first combination.

In the case of the first timing "10:00" of FIG. 3, the area information in the first combination indicates the first area 200, as described above. The first terminal device 16a and the second terminal device 16b are located in the first area 200, and the third terminal device 16c is located in the second area 202. Therefore, the storage unit 64 of the first terminal device 16a and the second terminal device 16b stores the ID "1", i.e., the identification information. Meanwhile, the storage unit 64 of the third terminal device 16c does not store the ID "1", the identification information.

The processing unit 66 receives the first combination from the first reception unit 70. When notified by the storage unit 64, the processing unit 66 processes, i.e., plays back, the speech information in the first combination. The processing unit 66 outputs the speech information played back from the speaker 68 as speech. Meanwhile, when the processing unit 66 is not notified by the storage unit 64, the processing unit 66 discards the speech information. In the case of the first timing "10:00" of FIG. 3, the speaker 68 of the first terminal device 16a and second terminal device 16b outputs speech, but the speaker 68 of the third terminal device 16c does not output speech.

In the case of the second timing "11:00" of FIG. 3, the area information in the first combination indicates the second area 202, as described above. The first terminal device 16a and the third terminal device 16c are located in the first area 200, and the second terminal device 16b is located in the second area 202. Therefore, the storage unit 64 of the first terminal device 16a and the third terminal device 16c does not store the ID "2", i.e., the identification information. Meanwhile, the storage unit 64 of the second terminal device 16b stores the ID "2", the identification information. The storage unit 64 of the second terminal device 16b stores the ID "1" and the ID "2". Further, the speaker 68 of the first terminal device 16a and the third terminal device 16c does not output speech, but the speaker 68 of the second terminal device 16b outputs speech.

When the signal received by the reception unit 60 at a timing subsequent to the timing associated with the identification information in the first combination does not include area information, the second reception unit 72 acquires the second combination. As described above, the second combination includes the identification information and the speech information but does not include area information. The second reception unit 72 outputs the second combination to the processing unit 66.

The processing unit 66 receives the second combination from the second reception unit 72. When the identification information in the second combination matches any of the items of identification information stored in the storage unit 64, the processing unit 66 plays back the speech information in the second combination. The processing unit 66 outputs the speech information played back from the speaker 68 as speech. Meanwhile, when it does not match, the processing unit 66 discards the speech information.

In the case of the third timing "12:00" of FIG. 3, the identification information in the second combination is the ID "1", as described above. The storage unit 64 of the first terminal device 16a stores the ID "1", the storage unit 64 of the second terminal device 16b stores the ID "1" and the ID "2", and the storage unit 64 of the third terminal device 16c does not store the identification information. Therefore, the speaker 68 of the first terminal device 16*a* and the second terminal device 16*b* outputs speech, but the speaker 68 of the third terminal device 16*c* does not output speech. Referring to FIG. 3, the first terminal device 16*a* through the third terminal device 16*c* are located in the first area 200 or the second area 202, but an operation similar to that of the operation described above is performed even when the terminal devices are not located in the first area 200 or in the second area 202 so long as the terminal devices are located in a communication-enabled range 204.

The second combination may include a plurality of items of identification information. The format of the second combination in this case is shown in FIG. 7C. In this case, the format includes "identification information 1", "identification information 2", and "speech information". "Identification information 1" and "identification information 2" indicate mutually different ID's. When any of the items of identification information in the second combination matches any of the items of identification information stored in storage unit 64, the processing unit 66 of the terminal device 16 plays back the speech information in the second combination.

Figure 11:
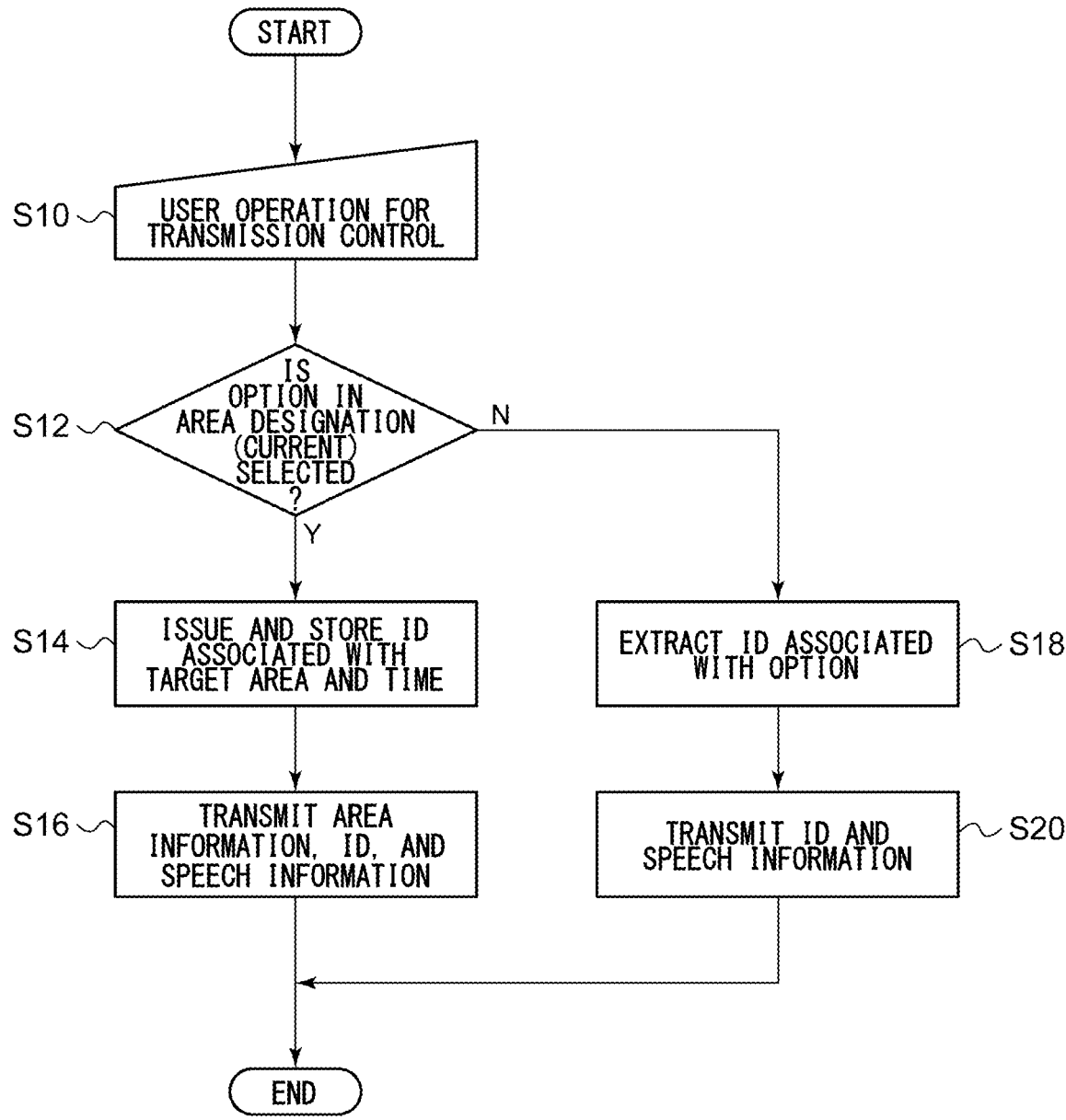
FIG. 11 is a flowchart showing the steps of transmission performed by the transmission device of FIG. 4.

A description will be given of the operation of the communication system 100 configured as described above. FIG. 11 is a flowchart showing the steps of transmission performed by the transmission device 20. The user initiates transmission control via the user operation unit 32 (S10). When an option in "area designation (current)" is selected (Y in S12), the generation unit 36 issues an ID associated with the target area and the time and stores the ID in the memory unit 38 (S14). The transmission unit 40 transmits the area information, the ID, and the speech information (S16). When no options in "area designation (current)" are selected (N in S12), the generation unit 36 extracts the ID corresponding to the option (S18). The transmission unit 40 transmits the ID and the speech information (S20).

Figure 12:
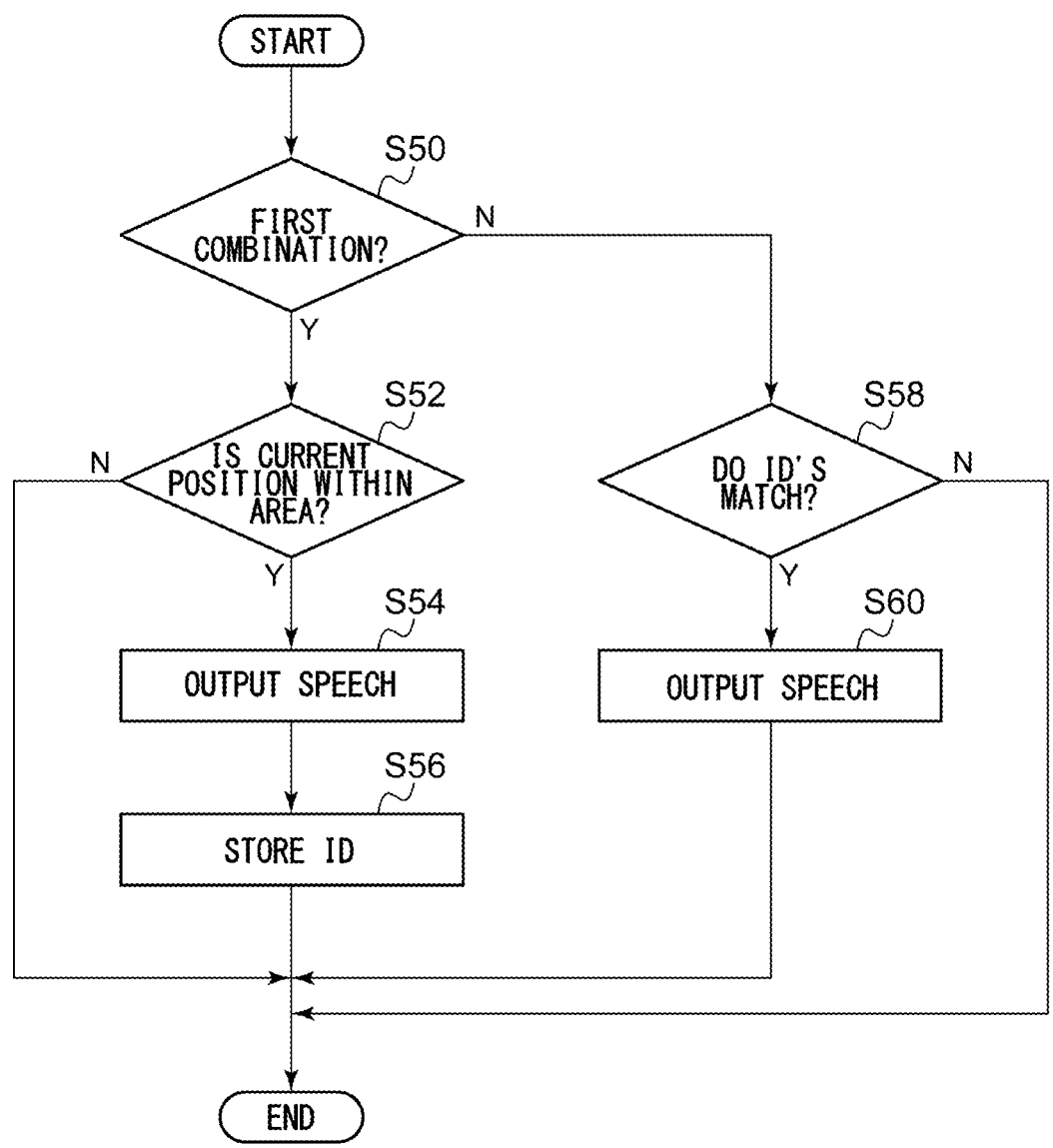
FIG. 12 is a flowchart showing the steps of reception performed by the reception device of FIG. 10.

FIG. 12 is a flowchart showing the steps of reception performed by the reception device 50. When the signal received is the first combination (Y in S50) and the current position is within the area (Y in S52), the processing unit 66 outputs speech (S54), and the storage unit 64 stores the ID (S56). When the current position is not within the area (N in S52), step 54 and step 56 are skipped. When the received signal is not the first combination (N in S50) and when the ID's match (Y in S58), the processing unit 66 outputs speech (S60). When the ID's do not match (N in S58), step 60 is skipped.

According to this embodiment, the area information and the identification information are included in the first combination. Therefore, the identification corresponding to the area information can be communicated. Further, since the second combination including the identification information and the speech information are transmitted after the first combination is transmitted, the speech information can be transmitted to the terminal device to which the identification information was communicated at the timing of transmission of the first combination. This allows the speech information to be transmitted to the terminal device located in a predetermined area in the past. Since the speech information is included in the first combination, the speech information can also be transmitted at the timing of transmission of the first combination. Further, when a time has elapsed since the transmission of information from the command station to the terminal device in the target area, information can be transmitted again to the terminal device targeted for reception at the timing that the information was transmitted.

When the first combination is received and when the terminal device is located in the area indicated by the area information in the first combination, the identification information in the first combination is stored. Therefore, the identification information can be acquired. When the second combination is received and when the identification information in the second combination and the identification information stored match, the speech information in the second combination is processed so that only the terminal device storing the identification information can output the speech. Since the first combination also includes the speech information, the speech information can also be processed when the first combination is received.

Embodiment 2

A description will now be given of Embodiment 2. Like Embodiment 1, Embodiment 2 relates to a communication system that designates an area and transmits speech information. Embodiment 2 also relates to transmission of speech information targeting a terminal device located in a predetermined area in the past. In Embodiment 1, the first combination including the area information, the identification information, and the speech information is transmitted, and then the second combination including the identification information and the speech information is transmitted. In other words, the identification information is communicated to the terminal device by transmitting the first combination at the timing of occurrence of speech information. Meanwhile, Embodiment 2 is directed to the purpose of communicating the identification information to the terminal device even when speech information does not occur. The command station according to Embodiment 2 does not include speech information in the first combination. Therefore, the command station transmits the first combination periodically, for example. The communication system 100, the command station 10, and the terminal device 16 according to Embodiment 2 are of the same type as those of FIG. 1, FIG. 4, and FIG. 10. The difference from the foregoing description will be highlighted.

As described above already, the generation unit 36 of FIG. 4 receives an instruction for selection of an area from the user operation unit 32 controlled by an operator. The generation unit 36 generates area information indicating the received area. Further, the generation unit 36 generates identification information that associates the area information indicating the area with the first timing when the area information should be transmitted. Further, the generation unit 36 generates a first combination including the area information and the identification information. As mentioned above, the first combination does not include the speech information. The generation unit 36 outputs the first combination to the transmission unit 40 and stores the detail of the first combination in the memory unit 38. The generation unit 36 may not receive an instruction for selection of an area from the user operation unit 32 controlled by an operator but may generate an instruction for selection of an area periodically and automatically. The subsequent steps are as described already, and a description thereof is omitted.

FIG. 13A-13B show formats of signals transmitted from the transmission unit 40 according to Embodiment 2. FIG. 13A shows a format of the first combination. As illustrated, the format includes "area information" and "identification information" but does not include speech information. FIG. 13B shows a format of the second combination. The illustrated format is identical to that of FIG. 7B.

Since the first combination does not include the speech information, the processing unit 66 of FIG. 10 does not play back the speech information even if the first combination is received. The other steps are as described already, and a description is omitted.

According to this embodiment, the first combination does not include the speech information. Therefore, the correspondence between the area information and the identification information can be communicated even in the absence of speech information. Since the correspondence between the area information and the identification information is communicated even in the absence of speech information, the frequency of communication can be increased.

Described above is an explanation based on an exemplary embodiment. The embodiment is intended to be illustrative only and it will be understood by those skilled in the art that various modifications to constituting elements and processes could be developed and that such modifications are also within the scope of the present invention.

In embodiments 1 and 2, the communication system 100 uses the business wireless system. However, the communication system 100 is not limited to this, and wireless communication systems other than the business wireless system may be used. For example, a mobile communication system may be used. In this case, PTT may be performed in the mobile communication system. According to this variation, the flexibility in the configuration can be improved.

In Embodiment 1, the first combination and the second combination include the speech information. In Embodiment 2, the second combination includes the speech information. Alternatively, the combination may include character information, image information, etc. Speech information, character information, and image information are generically referred to as data. According to this variation, the flexibility in the configuration can be improved.

In Embodiment 1, the format of the first combination differs from the format of the second combination. The formats can be discriminated according to the presence of area information. Alternatively, the format of the first combination and the format of the second combination may be identical. In this case, the format of the first combination and the format of the second combination may include an identifier for discriminating between the first combination and the second combination. According to this variation, the flexibility of the configuration of the format of the first combination and the format of the second combination is improved.

In Embodiments 1, 2, the generation unit 36 issues a new ID when it generates the first combination. Alternatively, the generation unit 36 may issue a new ID when a certain period of time has elapsed since the previous transmission and use the immediately preceding ID in the other cases. Still alternatively, the terminal device 16 may periodically transmit area information to the command station 10, and the command station 10 may issue a new ID when the command station 10 determines that the terminal device 16 moves across areas and use the immediately preceding ID in the other cases. According to this variation, ID's are used efficiently.

What is claimed is:

1. A transmission device comprising:
a generator that generates a first combination including (i) identification information associating area information indicating an area where data should be received and a timing when the area information should be transmitted, and (ii) the area information and that generates a second combination including the identification information in the first combination and data; and
a transmitter that transmits one of the first combination and the second combination generated by the generator, wherein
the generator generates the second combination at a further timing subsequent to the timing associated with the identification information in the first combination, and
the transmitter transmits the first combination at the timing associated with the identification information in the first combination and transmits the second combination at the further timing.

2. The transmission device according to claim 1, wherein the generator also includes data in the first combination.

3. A reception device comprising:
a first receiver that receives a first combination including (i) identification information associating area information indicating an area where data should be received and a timing when the area information should be transmitted, and (ii) the area information; and
a storage that stores the identification information in the first combination when the reception device is located in the area indicated by the area information in the first combination received by the first receiver;
a second receiver that receives a second combination including the identification information in the first combination and data, at a timing subsequent to the timing associated with the identification information in the first combination; and
a processor that processes the data in the second combination when the identification information in the second combination received by the second receiver matches the identification information stored in the storage.

4. The reception device according to claim 3, wherein the first combination received by the first receiver also includes data, and
the processor processes the data in the first combination.

5. A communication system comprising:
a transmission device that generates and transmits a first combination including (i) identification information associating area information indicating an area where data should be received and a timing when the area information should be transmitted, and (ii) the area information; and
a reception device that receives the first combination and stores the identification information in the first combination when the reception device is located in the area indicated by the area information in the first combination received, wherein
the transmission device generates and transmits a second combination including the identification information in the first combination and data, at a timing subsequent to the timing associated with the identification information in the first combination; and
the reception device receives the second combination and processes the data in the second combination when the identification information in the second combination received matches the identification information stored.

* * * * *